United States Patent
Fujimoto

(10) Patent No.: US 10,971,182 B2
(45) Date of Patent: Apr. 6, 2021

(54) MAGNETIC POWDER, MANUFACTURING METHOD OF MAGNETIC POWDER, AND MAGNETIC RECORDING MEDIUM

(71) Applicant: FUJIFILM Corporation, Tokyo (JP)

(72) Inventor: Takashi Fujimoto, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 331 days.

(21) Appl. No.: 15/992,396

(22) Filed: May 30, 2018

(65) Prior Publication Data

US 2018/0358045 A1 Dec. 13, 2018

(30) Foreign Application Priority Data

Jun. 9, 2017 (JP) .............................. JP2017-114787

(51) Int. Cl.
| | |
|---|---|
| *G11B 5/712* | (2006.01) |
| *C01G 49/00* | (2006.01) |
| *G11B 5/706* | (2006.01) |
| *H01F 1/11* | (2006.01) |

(52) U.S. Cl.
CPC .......... *G11B 5/712* (2013.01); *C01G 49/0018* (2013.01); *C01G 49/0045* (2013.01); *C01G 49/0063* (2013.01); *C01G 49/0072* (2013.01); *G11B 5/70631* (2013.01); *G11B 5/70642* (2013.01); *G11B 5/70678* (2013.01); *H01F 1/11* (2013.01); *C01P 2002/52* (2013.01); *C01P 2002/54* (2013.01); *C01P 2004/16* (2013.01); *C01P 2004/32* (2013.01); *C01P 2004/64* (2013.01); *C01P 2006/42* (2013.01)

(58) Field of Classification Search
CPC . G11B 5/712; G11B 5/70642; G11B 5/70678; C01G 49/0018; C01G 49/0045; C01G 49/0063; C01G 49/0072; H01F 1/11; C01P 2004/64; C01P 2006/42
See application file for complete search history.

(56) References Cited

U.S. PATENT DOCUMENTS 6,447,969 B1 9/2002 Ito et al.
2018/0208479 A1* 7/2018 Sakane .............. G11B 5/70642

FOREIGN PATENT DOCUMENTS

| JP | 01-119519 A | 5/1989 |
|---|---|---|
| JP | 11-306538 A | 11/1999 |
| JP | 2000-239022 A | 9/2000 |
| JP | 2000-272924 A | 10/2000 |
| JP | 2001-160211 A | 6/2001 |
| JP | 2001-312097 A | 11/2001 |
| JP | 2008-063200 A | 3/2008 |
| JP | 2009-224414 A | 10/2009 |
| JP | 2010-100467 A | 5/2010 |
| JP | 2017-024981 A | 2/2017 |

OTHER PUBLICATIONS

Communication dated Feb. 25, 2020, issued by the Japan Patent Office in application No. 2017-114787.

* cited by examiner

*Primary Examiner* — Holly Rickman
(74) *Attorney, Agent, or Firm* — Sughrue Mion, PLLC

(57) ABSTRACT

Magnetic powder includes: at least one epsilon-phase iron oxide-based compound selected from the group consisting of $\varepsilon\text{-}Fe_2O_3$ and a compound represented by Formula (1); and a surface treatment layer including a silane compound on at least a part of a surface. The magnetic powder has an average particle diameter of 8 nm to 20 nm. The content ratio of carbon atoms of the silane compound included in the surface treatment layer to iron atoms of the at least one epsilon-phase iron oxide-based compound selected from the group consisting of $\varepsilon\text{-}Fe_2O_3$ and the compound represented by Formula (1) is 0.05% to 0.5% in terms of the number of atoms. A manufacturing method thereof and applications thereof are also provided. In Formula (1), A represents at least one metal element other than Fe and a represents a number that satisfies a relationship of $0<a<2$.

$$\varepsilon\text{-}A_aFe_{2-a}O_3 \qquad (1)$$

16 Claims, No Drawings

MAGNETIC POWDER, MANUFACTURING METHOD OF MAGNETIC POWDER, AND MAGNETIC RECORDING MEDIUM

CROSS-REFERENCE TO RELATED APPLICATION

This application is based on and claims priority under 35 USC 119 from Japanese patent Application No. 2017-114787, filed Jun. 9, 2017, the disclosure of which is incorporated by reference herein.

BACKGROUND OF THE INVENTION

1. Field of the Invention

The present invention relates to magnetic powder, a manufacturing method of magnetic powder, and a magnetic recording medium.

2. Description of the Related Art

As magnetic powder used in a magnetic recording medium, hexagonal barium ferrite powder and the like are widely used. The hexagonal barium ferrite powder has a plate shape and can achieve a high filling percentage. However, in recent years, higher-performance magnetic powder is required along with realization of high performance of a magnetic recording medium.

For example, $\varepsilon$-$Fe_2O_3$ is attracting attention as a next-generation magnetic material, due to a great anisotropy field (hereinafter, may be referred to as Hk) and magnetization held even in a case of using particles having a smaller size, and accordingly, magnetic powder including $\varepsilon$-$Fe_2O_3$ and having an improved particle size distribution has been proposed (see JP2017-24981A).

SUMMARY OF THE INVENTION

However, since the magnetic powder including $\varepsilon$-$Fe_2O_3$ has a small particle diameter, Hk in a case of focusing on individual particle is great, but high magnetic properties, which are expected as a magnetic material, are not obtained, compared to hexagonal barium ferrite powder having a plate shape and capable of obtaining an excellent filling percentage. Accordingly, it is determined that, in a case where the magnetic powder is applied to a magnetic recording medium, it is difficult to further increase a signal to noise ratio (hereinafter, may be referred to as an SNR).

In addition, as a well-known method of improving dispersibility of magnetic powder, a method of changing the kind of a dispersing agent, a binding agent, and the like, or a method of increasing a content and the like is considered. However, according to the studies of the inventors, it is determined that, in a case where magnetic powder including $\varepsilon$-$Fe_2O_3$ has a fine sphere shape and dispersibility is improved by increasing a content of a dispersing agent by using a well-known dispersing agent, a content of the magnetic powder included in a magnetic layer comparatively decreases, an expected filling percentage is not obtained, and it is difficult to improve an SNR.

An object of one embodiment of the invention is to provide magnetic powder having excellent dispersibility and high magnetic strength.

Another object of the embodiment of the invention is to provide a manufacturing method of magnetic powder having excellent dispersibility and high magnetic strength.

Still another object of the embodiment of the invention is to provide a magnetic recording medium including a magnetic layer having an excellent filling percentage of magnetic powder and having high magnetic strength.

Means for achieving the aforementioned objects include the following aspects.

<1> Magnetic powder comprising: at least one epsilon-phase iron oxide-based compound selected from the group consisting of $\varepsilon$-$Fe_2O_3$ and a compound represented by Formula (1); and a surface treatment layer including a silane compound on at least a part of a surface, in which the magnetic powder has an average particle diameter of 8 nm to 20 nm, and a content ratio of carbon atoms of the silane compound included in the surface treatment layer to iron atoms of the at least one epsilon-phase iron oxide-based compound selected from the group consisting of $\varepsilon$-$Fe_2O_3$ and the compound represented by Formula (1) is 0.05% to 0.5% in terms of the number of atoms.

$$\varepsilon\text{-}A_a Fe_{2-a}O_3 \tag{1}$$

In Formula (1), A represents at least one metal element other than Fe and a represents a number that satisfies a relationship of $0 < a < 2$.

<2> The magnetic powder according to <1>, in which the compound represented by Formula (1) is a compound represented by Formula (1-2).

$$\varepsilon\text{-}A^1_x A^2_y A^3_z Fe_{(2-x-y-z)}O_3 \tag{1-2}$$

In Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, and $A^3$ represents at least one tetravalent metal element selected from the group consisting of Ti and Sn. x represents a number that satisfies a relationship of $0 < x < 1$, y represents a number that satisfies a relationship of $0 < y < 1$, z represents a number that satisfies a relationship of $0 < z < 1$, and $x+y+z < 2$.

<3> The magnetic powder according to <1> or <2>, in which the silane compound is a silane compound having a partial structure represented by Formula (I).

$$-Si-R^1 \tag{I}$$

In Formula (I), $R^1$ represents a hydrocarbon group having 3 to 20 carbon atoms.

<4> The magnetic powder according to any one of <1> to <3>, in which the silane compound is a silane compound having an aromatic ring in a molecule.

<5> The magnetic powder according to any one of <1> to <4>, in which a total content of at least one iron oxide-based compound selected from $\alpha$-$Fe_2O_3$ and $\gamma$-$Fe_2O_3$ is equal to or smaller than 20 parts by mass with respect to 100 parts by mass of a total content of at least one epsilon-phase iron oxide-based compound selected from the group consisting of $\varepsilon$-$Fe_2O_3$ and the compound represented by Formula (1).

<6> A manufacturing method of the magnetic powder according to any one of <1> to <5>, comprising: performing surface treatment with respect to a surface of particles of at least one epsilon-phase iron oxide-based compound selected from the group consisting of $\varepsilon$-$Fe_2O_3$ and the compound represented by Formula (1) with a silane compound including a hydrolyzable organic group in a molecule, to form a surface treatment layer including the silane compound on at least a part of the surface.

$$\varepsilon\text{-}A_a Fe_{2-a}O_3 \tag{1}$$

In Formula (1), A represents at least one metal element other than Fe and a represents a number that satisfies a relationship of 0<a<2.

<7> A magnetic recording medium comprising: a non-magnetic support; and a magnetic layer including the magnetic powder according to any one of <1> to <5> and provided on the non-magnetic support.

According to one embodiment of the invention, it is possible to provide magnetic powder having excellent dispersibility and high magnetic strength.

According to another embodiment of the invention, it is possible to provide a manufacturing method of magnetic powder having excellent dispersibility and high magnetic strength.

According to still another embodiment of the invention, it is possible to provide a magnetic recording medium including a magnetic layer having an excellent filling percentage of magnetic powder and having high magnetic strength.

DESCRIPTION OF THE PREFERRED EMBODIMENTS

Hereinafter, examples of specific embodiments of the invention will be described in detail, but the following embodiments are merely examples, and the invention is not limited to the following descriptions and can be performed with suitable changes within a desired range of the invention.

In this specification, a numerical value range shown with "to" indicates a range including numerical values written before and after "to", respectively as the minimum value and the maximum value.

In this specification, in a case where a plurality of kinds of substances corresponding to each component are included in a composition, the amount of each component included in the composition means a total amount of the plurality of kinds of substances, unless otherwise noted.

In the numerical value range disclosed in a stepwise manner in this specification, an upper limit value or a lower limit value disclosed in a certain numerical value range may be replaced with an upper limit value or a lower limit value of another numerical value range disclosed in a stepwise manner. In addition, in the numerical value range disclosed in this specification, an upper limit value or a lower limit value disclosed in a certain numerical value range may be replaced with values shown in examples.

In this specification, a term "step" not only means an independent step, but also includes a step, as long as the intended object of the step is achieved, even in a case where the step cannot be clearly distinguished from another step.

Magnetic Powder

Magnetic powder of this disclosure includes: at least one epsilon-phase iron oxide-based compound selected from the group consisting of $\varepsilon\text{-}Fe_2O_3$ and a compound represented by Formula (1); and a surface treatment layer including a silane compound on at least a part of the surface, in which an average particle diameter is 8 nm to 20 nm, and a content ratio of carbon atoms of the silane compound included in the surface treatment layer to iron atoms of the at least one epsilon-phase iron oxide-based compound selected from the group consisting of $\varepsilon\text{-}Fe_2O_3$ and the compound represented by Formula (1) (hereinafter, may be referred to as a C/Fe ratio), is 0.05% to 0.5% in terms of the number of atoms.

$$\varepsilon\text{-}A_aFe_{2-a}O_3 \quad (1)$$

In Formula (1), A represents at least one metal element other than Fe, and a represents a number that satisfies a relationship of 0<a<2.

Powder of metal formed of at least one epsilon-phase iron oxide-based compound selected from the group consisting of $\varepsilon\text{-}Fe_2O_3$ and the compound represented by Formula (1), that is, powder of metal not including a surface treatment layer may be referred to as "specific metal powder", hereinafter.

In general, it is difficult to hold magnetization with metal particles having a fine size, but $\varepsilon\text{-}Fe_2O_3$ has a great anisotropy field (Hk) as described above, and thus, it is possible to hold magnetization even with particles having a fine size. However, in a case of focusing on individual fine particle, strength of magnetization ($\alpha$s; emu/g) per unit weight (g) is ½ to ⅓ of that of hexagonal ferrite which is currently widely used magnetic powder and a shape of the particles is a sphere shape, in many cases. Accordingly, aggregation of the particles easily occurs and it is difficult to increase a filling percentage, and these disturb an increase in SNR, in a case where the fine particles are used as a magnetic material.

That is, problems regarding the magnetic powder of this disclosure are a great Hk and difficulties in improvement of dispersibility typical for spherical particles having a fine size, which were not studied in well-known magnetic powder of the related art. As described above, in fine magnetic powder, in a case where excellent dispersibility is not obtained, a sufficient filling percentage is not obtained or an expected effect of improving an SNR is not obtained, in a case of using the fine magnetic powder as a magnetic material.

These problems are solved with a method which was not realized with a well-known dispersing agent of the related art. As a result, it is possible to provide a magnetic recording medium which realizes improvement of a filling percentage and improvement of an SNR therewith, in a case where the magnetic powder of this disclosure is applied to a magnetic layer.

Specific Metal Powder

Examples of the compound represented by Formula (1) include a compound represented by Formula (1-2), a compound represented by Formula (2), a compound represented by Formula (3), a compound represented by Formula (4), a compound represented by Formula (5), and a compound represented by Formula (6), and the compound represented by Formula (1-2) is preferable.

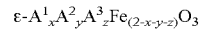

$$\varepsilon\text{-}A^1_xA^2_yA^3_zFe_{(2-x-y-z)}O_3 \quad (1\text{-}2)$$

In Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, and $A^3$ represents at least one tetravalent metal element selected from the group consisting of Ti and Sn. x represents a number that satisfies a relationship of 0<x<1, y represents a number that satisfies a relationship of 0<y<1, z represents a number that satisfies a relationship of 0<z<1, and x+y+z<2.

In Formula (1-2), regarding $A^1$, $A^2$, and $A^3$, $A^1$ is preferably a metal element selected from Ga and Al, $A^2$ is preferably a metal element selected from Co and Mn, and $A^3$ is preferably Ti, from viewpoints of stabilization of an $\varepsilon$ phase and magnetic properties.

In Formula (1-2), regarding x, y, and z, from a viewpoint of obtaining preferable magnetic properties to be applied to a magnetic recording medium, x preferably satisfies a relationship of 0<x<0.7, y preferably satisfies a relationship of $0<y<0.4$, z preferably satisfies a relationship of $0<z<0.4$, x more preferably satisfies a relationship of $0.05<x<0.4$, y more preferably satisfies a relationship of $0.01<y<0.2$, and z more preferably satisfies a relationship of $0.01<z<0.2$.

Specific examples of the compound represented by Formula (1-2) include $\varepsilon\text{-}Ga_{0.24}Co_{0.05}Ti_{0.05}Fe_{1.66}O_3$, $\varepsilon\text{-}Al_{(0.20)}Co_{(0.06)}Ti_{(0.06)}Fe_{(1.68)}O_3$, and $\varepsilon\text{-}Ga_{(0.15)}Mn_{(0.05)}Ti_{(0.05)}Fe_{(1.75)}O_3$.

$$\varepsilon\text{-}Z_zFe_{2-z}O_3 \qquad (2)$$

In Formula (2), Z represents at least one trivalent metal element selected from the group consisting of Ga, Al, and In. z represents a number that satisfies a relationship of $0<z<2$.

In Formula (2), Z is preferably a metal element selected from Ga and Al, from a viewpoint of stabilization of an ε phase.

z preferably satisfies a relationship of $0<z<0.8$ and more preferably satisfies a relationship of $0.05<z<0.6$, from a viewpoint of magnetic properties.

Specific examples of the compound represented by Formula (2) include $\varepsilon\text{-}Ga_{(0.55)}Fe_{(1.45)}O_3$ and $\varepsilon\text{-}Al_{(0.45)}Fe_{(1.55)}O_3$.

$$\varepsilon\text{-}X_xY_yFe_{2-x-y}O_3 \qquad (3)$$

In Formula (3), X represents at least one divalent metal element selected from the group consisting of Co, Ni, Mn, and Zn, and Y represents at least one tetravalent metal element selected from Ti and Sn. x represents a number that satisfies a relationship of $0<x<1$ and y represents a number that satisfies a relationship of $0<y<1$.

In Formula (3), X is preferably a metal element selected from Co and Mn and Y is preferably Ti, from a viewpoint of magnetic properties.

x preferably satisfies $0<x<0.4$, y preferably satisfies $0<y<0.4$, x more preferably satisfies $0<x<0.2$, and y more preferably satisfies $0<y<0.2$, from a viewpoint of stabilization of an ε phase.

Specific examples of the compound represented by Formula (3) include $\varepsilon\text{-}Co_{(0.05)}Ti_{(0.05)}Fe_{(1.9)}O_3$ and $\varepsilon\text{-}Mn_{(0.075)}Ti_{(0.075)}Fe_{(1.85)}O_3$.

$$\varepsilon X_xZ_zFe_{2-x-z}O_3 \qquad (4)$$

In Formula (4), X represents at least one divalent metal element selected from the group consisting of Co, Ni, Mn, and Zn, and Z represents at least one trivalent metal element selected from the group consisting of Ga, Al, and In. x represents a number that satisfies a relationship of $0<x<1$ and z represents a number that satisfies a relationship of $0<z<1$.

In Formula (4), X is preferably a metal element selected from Co and Mn, and Z is preferably a metal element selected from Ga and Al, from viewpoints of stabilization of an ε phase and magnetic properties.

x preferably satisfies $0<x<0.4$, z preferably satisfies a relationship of $0<z<0.6$, x more preferably satisfies a relationship of $0<x<0.2$, and z more preferably satisfies a relationship of $0.05<z<0.6$, from viewpoints of stabilization of an ε phase and magnetic properties.

Specific examples of the compound represented by Formula (4) include $\varepsilon\text{-}Mn_{(0.02)}Ga_{(0.5)}Fe_{(1.48)}O_3$ and $\varepsilon\text{-}Co_{(0.02)}Ga_{(0.4)}Fe_{(1.58)}O_3$.

$$\varepsilon\text{-}Y_yZ_zFe_{2-y-z}O_3 \qquad (5)$$

In Formula (5), Y represents at least one tetravalent metal element selected from Ti and Sn, and Z represents at least one trivalent metal element selected from the group consisting of Ga, Al, and In. y represents a number that satisfies a relationship of $0<y<1$ and z represents a number that satisfies a relationship of $0<z<1$.

In Formula (5), Y is preferably Ti, and Z is preferably a metal element selected from Ga and Al, from viewpoints of stabilization of an ε phase and magnetic properties.

y preferably satisfies a relationship of $0<y<0.4$, z preferably satisfies a relationship of $0<z<0.8$, y more preferably satisfies a relationship of $0<y<0.2$, and z more preferably satisfies a relationship of $0.05<z<0.6$, from viewpoints of stabilization of an ε phase and magnetic properties.

Specific examples of the compound represented by Formula (5) include $\varepsilon\text{-}Ti_{(0.02)}Ga_{(0.5)}Fe_{(1.48)}O_3$ and $\varepsilon\text{-}Ti_{(0.02)}Al_{(0.5)}Fe_{(1.48)}O_3$.

$$\varepsilon\text{-}X_xY_yZ_zFe_{2-x-y-z}O_3 \qquad (6)$$

In Formula (6), X represents at least one divalent metal element selected from the group consisting of Co, Ni, Mn, and Zn, Y represents at least one tetravalent metal element selected from Ti and Sn, and Z represents at least one trivalent metal element selected from the group consisting of Ga, Al, and In. x represents a number that satisfies a relationship of $0<x<1$, y represents a number that satisfies a relationship of $0<y<1$, z represents a number that satisfies a relationship of $0<z<1$, and $x+y+z<2$.

In Formula (6), X is preferably a metal element selected from Co and Mn, Y is preferably Ti, and Z is preferably a metal element selected from Ga and Al, from viewpoints of stabilization of an ε phase and magnetic properties.

In Formula (6), regarding x, y, and z, from a viewpoint of obtaining preferable magnetic properties to be applied to a magnetic recording medium, x preferably satisfies a relationship of $0<x<0.4$, y preferably satisfies a relationship of $0<y<0.7$, z preferably satisfies a relationship of $0<z<0.4$, x more preferably satisfies a relationship of $0.01<x<0.2$, y more preferably satisfies a relationship of $0.05<y<0.4$, and z more preferably satisfies a relationship of $0.01<z<0.2$.

Specific examples of the compound represented by Formula (6) include $\varepsilon\text{-}Ga_{0.24}Co_{0.05}Ti_{0.05}Fe_{1.66}O_3$, $\varepsilon\text{-}Al_{(0.20)}Co_{(0.06)}Ti_{(0.06)}Fe_{(1.68)}O_3$, and $\varepsilon\text{-}Ga_{(0.15)}Mn_{(0.05)}Ti_{(0.05)}Fe_{(1.75)}O_3$.

A confirmation method of a composition and a crystal structure of an iron oxide-based compound is described in examples.

The specific metal powder can be prepared by the following method, for example.

First, a trivalent iron compound such as iron nitrate and a metal compound including a metal element other than iron, included in the specific metal powder, if necessary, are dissolved in water, ammonia is added thereto, water is further added thereto, the mixture is heated to 50° C. to 90° C. and stirred, tetraethoxysilane (TEOS) is added dropwise thereto, and the mixture is stirred for approximately 5 hours to 36 hours.

The obtained reaction solution is left overnight in a drying machine at 70° C. to 100° C., the precipitated solid is washed with pure water and dried again, thereby obtaining a precursor of the specific metal powder.

A furnace is filled with the obtained precursor of the specific metal powder, subjected to heat treatment in the atmosphere, at a temperature of 900° C. to 1,200° C. for 3 hours to 6 hours, the resultant material is put into a sodium hydroxide (NaOH) aqueous solution having a concentration of 4 mol/L and stirred at a liquid temperature of 60° C. to 90° C. for 5 hours to 36 hours, to remove silicon oxide, the powder is collected by performing centrifugal separation, the powder is washed with pure water, thereby obtaining the specific metal powder.

A particle shape of the specific metal powder is not particularly limited and is for example, preferably a sphere shape or a rod shape, and is preferably a sphere shape, from a viewpoint of further improving dispersibility and alignment properties.

Regarding a particle diameter of the specific metal powder, an average particle diameter thereof is 8 nm to 20 nm, preferably 10 nm to 18 nm, and more preferably 11 nm to 17 nm.

The particles having the average particle diameter of the specific metal powder in the range described above and including the surface treatment layer described above can be suitably used in a magnetic recording medium as the magnetic powder.

The particle diameter can be controlled according to the heat treatment temperature in the furnace. For example, as the heat treatment temperature in the furnace is low, the particle diameter tends to further decrease, and as the heat treatment temperature in the furnace is high, the particle diameter tends to further increase.

The average particle diameter of the specific metal powder can be calculated by the following method.

The specific metal powder is imaged at a magnification ratio of 50,000 to 80,000 by using a transmission electron microscope (TEM), and printed on photographic printing paper so that the total magnification becomes 500,000, and accordingly, an image of the particles configuring the powder is obtained.

A primary particle is selected from the obtained image of the particles, an outline of the particle is traced with a digitizer, and a diameter (equivalent circle area diameter) of a circle having the same area as the traced region is calculated to measure a size of the particle (primary particle). Here, the primary particle is an independent particle which is not aggregated.

In this specification, the above measurement is performed with respect to 500 randomly extracted particles, and an arithmetical mean of the obtained 500 particle sizes is set as an average particle size of the powder.

As the transmission electron microscope, H-9000 manufactured by Hitachi, Ltd. can be used, for example. In addition, the measurement of the particle size can be performed by using image analysis software KS-400 manufactured by Carl Zeiss, for example. The correction of the scale in a case of performing image capture and image analysis from a scanner can be performed by using a circle having a diameter of 1 cm, for example.

Not only the specific metal powder, but also average particle diameters of magnetic powder, non-magnetic particles as an arbitrary component, and the like can be measured by the same method described above.

Surface Treatment Layer

The magnetic powder of this disclosure includes a surface treatment layer including a silane compound on at least a part of the surface of the specific metal powder described above.

The surface treatment layer including a silane compound may be included in the whole area of the surface of the specific metal powder, but is not necessarily included in the whole area of the surface thereof. For example, a surface treatment layer which is discontinuously provided on the surface of the specific metal powder, that is, a surface treatment layer partially including an unformed region of the surface treatment layer may be provided, or a surface treatment layer may be locally provided at a part of the surface of the specific metal powder. That is, by providing the surface treatment layer including a silane compound on the surface of the specific metal powder, although it is locally provided, it is possible to obtain the effects of this disclosure.

The silane compound included in the surface treatment layer is preferably a silane compound having a partial structure represented by Formula (I).

In Formula (I), $R^1$ represents a hydrocarbon group having 3 to 20 carbon atoms.

A hydrocarbon group represented by $R^1$ may be linear, may include a branched chain, or may have a cyclic structure.

In addition, the silane compound is more preferably a silane compound having an aromatic ring in a molecule.

In the surface treatment layer, it is more preferable that the specific metal powder is formed by treatment with a silane compound including a hydrolyzable group, as a silane coupling agent, as will be described later. In a case where the hydrolyzable group causes hydrolysis to be adsorbed to the specific metal powder and form a surface treatment layer including a silane compound including one silicon element, a layer having a smaller thickness than that of a surface treatment layer manufactured by using a polycyloxane compound or the like is formed.

The operation of the magnetic powder of this disclosure including the surface treatment layer including a silane compound is not clear. However, it is thought that, regarding the magnetic powder including a surface treatment layer which is formed on at least a part of the surface of the specific metal powder by performing surface treatment preferably with a silane coupling agent to have a constant thickness, an interaction between the specific metal powder and a binding agent is improved in a case of forming a magnetic layer including the specific metal powder and the binding agent, aggregation of the specific metal powder is prevented with a smaller amount of binding agent, and an excellent dispersed state can be obtained. That is, dispersibility of the magnetic material increases due to the presence of the surface treatment layer, and aggregation of particles is effectively prevented, even in a case of using fine specific metal powder having an average particle diameter equal to or smaller than 20 nm.

Accordingly, in a case of forming a magnetic layer by applying the magnetic powder including the surface treatment layer to a magnetic recording medium which will be described later, a higher filling percentage can be achieved, compared to particles including a surface treatment layer including a dispersing agent for well-known metal powder.

Since the filling of the fine metal powder can be performed with an excellent filling percentage, more excellent magnetism of the magnetic layer of the magnetic recording medium is exhibited. Thus, it is thought that the magnetic powder of this disclosure is magnetic powder suitable for a magnetic recording medium.

$R^1$ of Formula (I) represents a hydrocarbon group having 3 to 20 carbon atoms. The number of carbon atoms in the hydrocarbon group is preferably 6 to 18 and more preferably 8 to 12.

A hydrocarbon group represented by $R^1$ may be linear, may include a branched chain, or may have a cyclic structure. The cyclic structure may be a structure of an aliphatic ring or an aromatic ring.

As the silane compound used for forming the surface treatment layer, a silane compound including a hydrolyzable organic group in a molecule can be used. As the silane compound including a hydrolyzable organic group in a molecule, a silane compound including at least one kind of a silanol group is used. As the silane compound including a hydrolyzable organic group in a molecule, a well-known silane coupling agent can be preferably used. Examples of the silane compound include dodecyltriethoxysilane, triethoxyoctylsilane, hexyltrimethoxysilane, trimethoxypropylsilane, triethoxyphenyl silane, p-styryltrimethoxysilane, N-phenyl-3-aminopropyltrimethoxysilane, vinylmethoxysilane, Vinyltriethoxysilane, 3-mercaptopropyl methyldimethoxysilane, 3-mercaptopropyl trimethoxysilane, 3-isocyanatepropyltriethoxysilane, 3-acryloxypropyltrimethoxysilane, 3-aminopropyltrimethoxysilane, 3-aminopropyltri ethoxysilane, 1-[3-(trimethoxysilyl) propyl] urea, 3-aminopropyldiethoxymethylsilane, and [3-(N, N-dimethylamino) propyl] trimethoxysilane, and among these, triethoxyphenylsilane, N-phenyl-3-aminopropyltrimethoxysilane, and the like including an aromatic group in a molecule are preferable.

A Si atom of the silane compound described above and a hydrocarbon group which are used in the formation of the surface treatment layer are adsorbed to the specific metal powder and fixed, thereby forming the surface treatment layer. The surface treatment layer may not be necessarily formed over the whole area of the surface of the specific metal powder. However, it is preferable that the surface treatment layer included in the specific metal powder includes a specific amount or more of the silane compound, from a viewpoint of the effect.

The silane compound included in the surface treatment layer can be confirmed by X-ray photoelectron spectroscopic analysis (XPS) which will be described later.

Regarding a content of the Si atom in the surface treatment layer, a content ratio (Si/Fe: atom number ratio) of the Si atoms of the silane compound included in the surface treatment layer to iron atoms of the specific metal powder is preferably 0.02% to 0.2%.

In addition, as a formation condition of the surface treatment layer, a condition of a content ratio (C/Fe: atom number ratio) of carbon atoms of the silane compound included in the surface treatment layer to iron atoms of the specific metal powder which is 0.05% to 0.5% is preferably selected. The C/Fe content ratio is preferably 0.1% to 0.4% and more preferably 0.15% to 0.3%.

Confirmation of Silane Compound in Surface Treatment Layer and C/Fe Content Ratio The surface treatment layer in metal powder such as the specific metal powder can be confirmed by using X-ray photoelectron spectroscopic analysis (XPS).

The XPS measurement can be performed by using an X-ray photoelectron spectroscopic analysis device (AXIS-ULTRA: product name) manufactured by Shimadzu Corporation.

The measurement method will be described in the section of examples.

A manufacturing method of the magnetic powder of this disclosure including the surface treatment layer including the silane compound is not particularly limited.

Above all, the metal powder is preferably manufactured by a manufacturing method including a step of performing surface treatment of a surface of specific metal powder with a silane compound including a hydrolyzable organic group in a molecule to form a surface treatment layer including a silane compound on at least a part of the surface.

As the method of the surface treatment, a well-known method is suitably used.

For example, a method of dispersing the specific metal powder in a solvent such as ethanol, adjusting pH of a dispersion liquid to have acidity of 2 to 4 by adding acid such as hydrochloric acid, adding a silane compound thereto, sufficiently stirring the mixture to allow the silane compound to be adsorbed to the surface of the specific metal powder, and performing the washing is used.

The stirring is preferably performed for 5 minutes to 120 minutes by setting a liquid temperature to room temperature (25° C.) to 60° C.

The added amount of silane compound used for forming the surface treatment layer is preferably 0.05 parts by mass to 2.0 parts by mass and more preferably 0.1 parts by mass to 1.2 parts by mass with respect to 100 parts by mass of the specific metal powder.

In the range described above, it is possible to set the C/Fe content ratio of the surface treatment layer to be in a suitable range.

The C/Fe content ratio of the surface treatment layer can be adjusted by controlling the kind and the content of the silane compound used for the surface treatment of the specific metal powder. In addition, the C/Fe content ratio can also be adjusted by suitably controlling a liquid temperature, a surface treatment time, and pH of the solution of the surface treatment.

Other Components which can be Included in Magnetic Powder

The magnetic powder of this disclosure may further include other components, if necessary, in addition to the specific metal powder including the surface treatment layer described above.

As the other components, for example, metal powder other than the specific metal powder is used.

As the metal powder other than the specific metal powder, for example, at least one iron oxide-based compound selected from $\alpha\text{-}Fe_2O_3$ and $\gamma\text{-}Fe_2O_3$ (hereinafter, may be referred to as other iron oxide-based compound). A total content of at least one iron oxide-based compound selected from $\alpha\text{-}Fe_2O_3$ and $\gamma\text{-}Fe_2O_3$ is preferably equal to or smaller than 20 parts by mass with respect to 100 parts by mass of the content of the specific metal powder.

That is, by replacing at least a part of the specific metal powder with the other iron oxide-based compound generally used for magnetic powder, it is possible to adjust magnetic properties and reducing the cost within a range not deteriorating performance. Meanwhile, the specific metal powder preferably has a single phase, that is, a phase not including metal powder other than the specific metal powder, and may include at least one iron oxide-based compound selected from $\alpha\text{-}Fe_2O_3$ and $\gamma\text{-}Fe_2O_3$ as inevitable impurities.

In any case, the content of the other iron oxide-based compound with respect to 100 parts by mass of the content of the specific metal powder is preferably equal to or smaller than 20 parts by mass and more preferably equal to or smaller than 5 parts by mass.

Magnetic Recording Medium

The magnetic powder of this disclosure described above is suitably used in a magnetic recording medium.

The magnetic recording medium of this disclosure is a magnetic recording medium including a non-magnetic support, and a magnetic layer including magnetic powder of this disclosure described above and provided on the non-magnetic support.

The magnetic recording medium of this disclosure includes a non-magnetic support, and a magnetic layer including ferromagnetic powder and a binding agent on at least one surface of the non-magnetic support. That is, the magnetic recording medium includes a non-magnetic support as a base material and a magnetic layer as a magnetic recording layer, and may include other layers according to the purpose.

Examples of the other layers which can be included in the magnetic recording medium of this disclosure include a non-magnetic layer, a back coating layer, and the like. The other layers will be described later.

Non-Magnetic Support

The non-magnetic support indicates a support not having magnetism. Hereinafter, the non-magnetic support may be simply referred to as a "support".

The expression "not having magnetism" means that at least any of conditions of a residual magnetic flux density equal to or smaller than 10 mT and coercivity equal to or smaller than 7.98 kA/m (100 Oe) is satisfied.

For the support, a base material formed with a material not having magnetism, for example, a material such as a resin material not including a magnetic material or an inorganic material not having magnetism can be used. A material of the non-magnetic support can be suitably selected and used from materials satisfying requirement such as physical properties such as formability necessary for the magnetic recording medium or durability of the formed support.

The support is selected according to the usage aspect of the magnetic recording medium. For example, in a case where the magnetic recording medium is a magnetic tape, a flexible disk, or the like, a resin film having flexibility can be used as the support. In a case where the magnetic recording medium is a hard disk, for example, a resin formed body, an inorganic material formed body, or a metal material formed body which has a disk shape and is harder than the support for a flexible disk, can be used as the support.

Examples of the resin material used for forming the support include a resin material such as polyester such as polyethylene terephthalate (PET) or polyethylene naphthalate (PEN), polyolefin such as polyethylene or polypropylene, an amide-based resin such as aromatic polyamide including polyamide, polyamide imide, or polyaramide, polyimide, cellulose triacetate (TAC), polycarbonate (PC), polysulfone, and polybenzoxazole. The support can be formed by suitably selecting the resin materials described above.

Among these, polyester, the amide-based resin, and the like are preferable, and polyethylene terephthalate, polyethylene naphthalate, and polyamide are more preferable, from viewpoints of excellent strength and durability and ease of processing.

In a case of using the resin material in the support such as a magnetic tape, the resin material is formed to have a film shape. As a method of forming the resin material in a film shape, a well-known method can be used.

The resin film may be an unstretched film or may be a uniaxially stretched film or a biaxially stretched film. For example, in a case of using polyester, a biaxially stretched polyester film can be used, in order to improve dimensional stability.

In addition, a film having a laminated structure of two or more layers can be used according to the purpose. That is, for example, as disclosed in JP1991-224127A (JP-H03-224127A), a support obtained by laminating a film including two different layers can also be used, in order to change surface roughness of a surface on which a magnetic layer is formed and a surface on which a magnetic layer is not formed.

In a case where the magnetic recording medium is a hard disk, a resin formed body obtained by forming the resin material described above in a disk shape, or an inorganic material formed body obtained by forming an inorganic material such as glass or a metal material such as aluminum in a disk shape can be used as the support.

For example, in order to improve adhesiveness with the magnetic layer to be provided on the surface of the support, surface treatment such as corona discharge, plasma treatment, easy bonding treatment, or heat treatment may be performed with respect to the support in advance, if necessary. In addition, in order to prevent foreign materials from mixing into the magnetic layer, surface treatment such as dust protection treatment may be performed with respect to the support.

Each surface treatment described above can be performed by a well-known method.

A thickness of the support is not particularly limited and can be suitably set according to the use of the magnetic recording medium. The thickness of the support is preferably 3.0 μm to 80.0 μm. For example, in a case where the magnetic recording medium is a magnetic tape, the thickness of the support is preferably 3.0 μm to 6.5 μm, more preferably 3.0 μm to 6.0 μm, and even more preferably 4.0 μm to 5.5 μm.

The thicknesses of the non-magnetic support and each layer of the magnetic recording medium which will be described later can be acquired by exposing a cross section of the magnetic recording medium in a thickness direction by a well-known method such as ion beams or a microtome, performing cross section observation regarding the exposed cross section with a scanning electron microscope, and obtaining a thickness of a portion in a thickness direction in the cross section observation or obtaining an arithmetical mean of thicknesses obtained in randomly extracted two or more of plural portions (for example, two portions).

Magnetic Layer

The magnetic layer is a layer contributing to magnetic recording. The magnetic layer is preferably a layer including ferromagnetic powder including the magnetic powder of this disclosure described above and a binding agent which is a film forming component, as a magnetic material, and may further include additives according to the purpose.

Ferromagnetic Powder

The ferromagnetic powder of the magnetic layer includes the magnetic powder of this disclosure.

In a case where the magnetic layer includes the specific magnetic powder of this disclosure, an SNR of the magnetic recording medium is significantly improved as described above.

In a case where the magnetic layer includes ferromagnetic powder other than the magnetic powder of this disclosure (other ferromagnetic powder), a content of the other ferromagnetic powder with respect to 100 parts by mass of the magnetic powder of this disclosure is preferably equal to or smaller than 20 parts by mass.

A measurement method of an average primary particle diameter of the magnetic powder of this disclosure and the other ferromagnetic powder is as described above. The measurement method of an average primary particle diameter of the magnetic powder will be described in detail in the examples which will be described later.

Sample powder of the magnetic powder or the other ferromagnetic powder for measuring the average primary particle diameter may be raw material powder or sample powder collected from the magnetic layer.

As a method of collecting magnetic powder from the magnetic layer as the sample powder, the following method is used, for example.

1. The surface treatment is performed with respect to the surface of the magnetic layer with a plasma reactor manufactured by Yamato Scientific Co., Ltd. for 1 to 2 minutes, and an organic component (binding agent component and the like) on the surface of the magnetic layer is incinerated and removed.

2. A filter paper dipped in an organic solvent such as cyclohexanone or acetone is bonded to an edge part of a metal rod, the surface of the magnetic layer subjected to the treatment of 1. is rubbed thereon, the component of the magnetic layer is peeled off and transferred to the filter paper from the magnetic recording medium.

3. The component of the magnetic layer peeled in 2. is shaken off to fall into an organic solvent such as cyclohexanone or acetone, the organic solvent is dried, and the peeled component is extracted from the filter paper. As the method of shaking, a method of shaking the filter paper off to put into the solvent by an ultrasonic disperser can be used.

4. The component of the magnetic layer scraped off in 3. is put into a sufficiently washed glass test tube, approximately 20 ml of n-butylamine with respect to the amount of the component of the magnetic layer is added into the glass test tube, and the glass test tube is sealed. The amount of n-butylamine capable of decomposing the remaining binding agent without being incinerated is preferably added.

5. The glass test tube is heated at 170° C. for 20 hours or longer, and organic components included in the magnetic layer such as the binder and the curing agent component are decomposed.

6. The precipitate after the decomposition in 5. is sufficiently washed with pure water and dried, and powder is extracted.

With the steps described above, the sample powder can be collected from the magnetic layer and used for the measurement of the average primary particle diameter.

A content (filling percentage) of the ferromagnetic powder in the magnetic layer is preferably 50% to 90% by mass and more preferably 60% to 90% by mass with respect to dry mass of the magnetic layer. The filling percentage of the ferromagnetic powder in the magnetic layer is set to be equal to or greater than 50% by mass with respect to dry mass of the magnetic layer, thereby improving recording density.

The magnetic powder of this disclosure is preferably magnetic powder including a surface treatment layer formed by surface treatment performed with a silane coupling agent in specific conditions. Accordingly, although the particle diameter thereof is smaller than that of general magnetic particles used in the related art, excellent dispersibility is obtained, a filling percentage can be further improved, and recording density is further improved.

Binding Agent

The binding agent is selected from film forming resins which are useful for forming the magnetic layer including the ferromagnetic powder described above.

The resin used for the binding agent is not particularly limited, as long as it can form a resin layer satisfying various physical properties such as desired hardness or durability. The resin can be suitably selected from well-known film forming resins according to the purpose and used as the binding agent.

The resin used for the binding agent may be a homopolymer or a copolymer. The resin used for the binding agent may be a well-known electron beam-curable resin.

As the resin used for the binding agent, a resin selected from polyurethane, polyester, polyamide, a vinyl chloride resin, styrene, acrylonitrile, an acryl resin obtained by (co) polymerization of methyl methacrylate, a cellulose resin such as nitrocellulose, an epoxy resin, a phenoxy resin, a polyvinylalkylal resin such as polyvinyl acetal or polyvinyl butyral can be used. The resin used for the binding agent may be used alone, or the plurality of resins can be used in a mixed manner. Among these, the polyurethane resin, the acryl resin, the cellulose resin, and the vinyl chloride resin are preferable.

In order to further improve dispersibility of the ferromagnetic powder included in the magnetic layer, the resin which is the binder preferably includes a functional group which can be adsorbed to the surface of the powder, for example, a polar group in a molecule. Examples of the preferable functional group which can be included in the resin which is the binding agent include $—SO_3M$, $—SO_4M$, $—PO(OM)_2$, $—OPO(OM)_2$, $—COOM$, $=NSO_3M$, $—NRSO_3M$, $—NR^1R^2$, and $—N^+R^1R^2R^3X^-$. Here, M represents a hydrogen atom or an alkali metal atom such as Na or K. R represents an alkylene group, R1, R2, and R3 each independently represent a hydrogen atom, an alkyl group, or a hydroxyalkyl group. X represents a halogen atom such as Cl or Br.

In a case where the resin which is the binding agent includes the functional group, the content of the functional group in the resin is preferably 0.01 meq/g to 2.0 meq/g, and more preferably 0.3 meq/g to 1.2 meq/g. It is preferable that the content of functional group in the resin is set to be in the range described above, because dispersibility of the ferromagnetic powder and the like in the magnetic layer is further improved and magnetic flux density is further improved.

Among these, the resin used for the binding agent is more preferably polyurethane including a $—SO_3Na$ group. In a case where polyurethane includes the $—SO_3Na$ group, the content of $—SO_3Na$ group is preferably 0.01 meq/g to 1.0 meq/g with respect to that of polyurethane.

As the binding agent, a commercially available resin can be suitably used.

An average molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

Sample concentration: 0.5% by mass

Sample injection amount: 10 µl

Flow rate: 0.6 ml/min

Measurement temperature: 40° C.

Detector: RI detector

The content of the binding agent in the magnetic layer can be 1 part by mass to 30 parts by mass and is preferably 2 parts by mass to 20 parts by mass with respect to 100 parts by mass of the ferromagnetic powder.

Other Additives

The magnetic layer can include various additives, if necessary, in addition to the ferromagnetic powder and the binding agent described above, within a range not negatively affecting the effects of the magnetic layer.

Examples of the additives include an abrasive, a lubricant, a dispersing agent, a dispersing assistant, an antibacterial agent, an antistatic agent, an antioxidant, and carbon black.

In addition, as the additives, colloid particles as an inorganic filler, and a curing agent can also be used, if necessary.

As the additive, a commercially available product can be suitably used according to desired properties.

Abrasive

The magnetic layer can include an abrasive. In a case where the magnetic layer includes an abrasive, attached materials which are attached to a head during the usage of the magnetic recording medium can be removed.

As the abrasive, mainly well-known materials having Mohs hardness equal to or greater than 6 such as α-alumina having an a transformation rate equal to or greater than 90%, β-alumina, silicon carbide, chromium oxide, cerium oxide, α-iron oxide, corundum, artificial diamond, silicon nitride, silicon carbide, titanium carbide, titanium oxide, silicon dioxide, and boron nitride are preferably used alone or in combination thereof. In addition, a complex of these abrasives (abrasive subjected to surface treatment with another abrasive) may be used.

A compound or an element other than the metal compound particles which are main components may be included in the abrasive, but there is no change in effect, as long as the content of the main component is equal to or greater than 90% by mass.

In addition, as the abrasive, a material obtained by performing surface treatment of the particles may be used.

As the abrasive, a commercially available product can be suitably used.

Specific examples of the commercially available product of the abrasive include AKP-12, AKP-15, AKP-20, AKP-30, AKP-50, HIT20, HIT-30, HIT-55, HIT60A, HIT70, HIT80, and HIT100 manufactured by Sumitomo Chemical Co., Ltd.; ERC-DBM, HP-DBM, and HPS-DBM manufactured by Reynolds Co., Ltd.; WA10000 manufactured by Fujimi Incorporated; UB20 manufactured by Uyemura & Co., Ltd.; G-5, Kromex U2, and Kromex U1 manufactured by Nippon Chemical Industrial Co., Ltd.; TF100 and TF140 manufactured by Toda Kogyo Corp.; Beta Random Ultrafine manufactured by IBIDEN CO., LTD.; and B-3 manufactured by Showakogyo Co., Ltd.

A particle size of the abrasive is preferably 0.01 μm to 2 μm, more preferably 0.05 μm to 1.0 μm, and even more preferably 0.05 μm to 0.5 μm.

Particularly, in order to increase electromagnetic conversion characteristics, it is preferable that particle size distribution of the abrasive is narrow. In addition, in order to improve durability, the same effect can also be exhibited by combining abrasives having different particle sizes, if necessary, or widening the particle size distribution even with a single abrasive. Regarding the abrasive, a tap density is preferably 0.3 g/ml to 2 g/ml, a water content thereof is preferably 0.1% to 5%, pH thereof is preferably 2 to 11, and a BET specific surface area (SBET) is preferably 1 m2/g to 30 m2/g.

The shape of the abrasive may be any of a needle shape, a sphere shape, or a cube shape, and a particle having a shape including a corner in a part is preferable due to high abrasive properties.

In a case where the magnetic layer includes the abrasive, the content thereof is preferably 1 part by mass to 10 parts by mass with respect to 100 parts by mass of the ferromagnetic powder.

Lubricant

The magnetic layer can include a lubricant.

In a case where the magnetic layer includes the lubricant, running durability of the magnetic recording medium can be improved, for example.

As the lubricant, a well-known hydrocarbon-based lubricant and a fluorine-based lubricant can be used.

As the lubricant, a commercially available product may be suitably used.

As the lubricant, a well-known hydrocarbon-based lubricant, a fluorine-based lubricant, or an extreme pressure additive can be used.

Examples of the hydrocarbon-based lubricant include carboxylic acids such as stearic acid or oleic acid; esters such as butyl stearate; sulfonic acids such as octadecylsulfonic acid; phosphoric acid esters such as monoctadecyl phosphate; alcohols such as stearyl alcohol or oleyl alcohol; carboxylic acid amide such as stearic acid amide; and amines such as stearyl amine.

As the fluorine-based lubricant, a lubricant obtained by substituting a part of or the entire alkyl group of the hydrocarbon-based lubricant with a fluoroalkyl group or a perfluoropolyether group.

Examples of the perfluoropolyether group include a perfluoromethylene oxide polymer, a perfluoroethylene oxide polymer, a perfluoro-n-propylene oxide polymer $(CF_2CF_2CF_2O)_n$, a perfluoroisopropylene oxide polymer $(CF(CF_3)CF_2O)_n$, or a copolymer thereof.

In addition, a compound including a polar functional group such as a hydroxyl group, an ester group, or a carboxyl group at a terminal or in a molecule of the alkyl group of the hydrocarbon-based lubricant is suitable due to a high effect of decreasing a frictional force.

Further, a molecular weight of the lubricant is 500 to 5,000 and preferably 1,000 to 3,000. By setting the molecular weight thereof to be 500 to 5,000, it is possible to prevent volatilization and prevent a deterioration in lubricity. In addition, an increase in viscosity is prevented, and generation of running stop or head crush due to ease of adsorption of a slider and a disk can be prevented.

Specifically, perfluoropolyether which can be used as the lubricant is, for example, commercially available as a product name such as FOMBLIN manufactured by Ausimont or KRYTOX manufactured by DuPont.

Examples of the extreme pressure additive include phosphate esters such as trilauryl phosphate; Phosphite esters such as trilauryl phosphate; thiophosphite esters or thiophosphate esters such as trilauryl trithiophosphite; and a sulfur-based extreme pressure agent such as dibenzyl disulfide.

In a case where the magnetic layer includes the lubricant, the lubricant may be used alone or in combination of two or more kinds thereof.

In a case where the magnetic layer includes the lubricant, the content thereof is preferably 0.1 parts by mass to 5 parts by mass with respect to 100 parts by mass of ferromagnetic powder.

Non-Magnetic Filler

The magnetic layer can include a non-magnetic filler. The non-magnetic filler is preferably colloid particles, from viewpoints of dispersibility and surface roughness.

The colloid particles are preferably inorganic colloid particles or more preferably inorganic oxide colloid particles, from a viewpoint of availability. As the inorganic oxide colloid particles, the colloid particles of the inorganic oxide described above can be used, and complex inorganic oxide colloid particles such as $SiO_2/Al_2O_3$, $SiO_2/B_2O_3$, $TiO_2/CeO_2$, $SnO_2/Sb_2O_3$, $SiO_2/Al_2O_3/TiO_2$, or $TiO_2/CeO_2/SiO_2$ can also be used. Inorganic oxide colloid particles such as $SiO_2$, $Al_2O_3$, $TiO_2$, $ZrO_2$, or $Fe_2O_3$ can be preferably used, and silica colloid particles (colloidal silica) are particularly preferable, from a viewpoint of availability of monodisperse colloid particles.

In a case where the magnetic layer includes the non-magnetic filler, the non-magnetic filler may be used alone or in combination of two or more kinds thereof.

As the non-magnetic filler, a commercially available product can be suitably used.

In a case where the magnetic layer includes the non-magnetic filler, the content thereof is preferably 1 part by mass to 10 parts by mass with respect to 100 parts by mass of ferromagnetic powder.

A thickness of the magnetic layer can be optimized according to a saturation magnetization amount of a magnetic head used, a head gap length, a recording signal band, and the like. The thickness of the magnetic layer is preferably 10 nm to 150 nm, more preferably 20 nm to 120 nm, and even more preferably 30 nm to 100 nm, from a viewpoint of high-density recording.

The magnetic layer may be at least one layer, or the magnetic layer can be separated to two or more layers having magnetic properties, and a configuration regarding a well-known multilayered magnetic layer can be applied. In a case of the multilayered magnetic layer, the thickness of the magnetic layer is a total thickness of the plurality of magnetic layers.

Hereinafter, the non-magnetic layer and the back coating layer which are predetermined layers of the magnetic recording medium will be described.

Non-Magnetic Layer

The non-magnetic layer is a layer contributing to thinning of the magnetic layer.

The non-magnetic layer is preferably a layer including non-magnetic powder as a filler and a binding agent which is a film forming component, and may further include additives, if necessary.

The non-magnetic layer can be provided between the non-magnetic support and the magnetic layer. The non-magnetic layer includes a layer not having magnetism, and a substantially non-magnetic layer including a small amount of ferromagnetic powder as impurities or intentionally.

Here, the "non-magnetic" state means that at least any of conditions of a residual magnetic flux density equal to or smaller than 10 mT and coercivity equal to or smaller than 7.98 kA/m (100 Oe) is satisfied, as described in the section of "non-magnetic support".

Non-Magnetic Powder

The non-magnetic powder is powder not having magnetism, which functions as a filler. The non-magnetic powder used in the non-magnetic layer may be inorganic powder or organic powder. In addition, carbon black or the like can also be used. Examples of the inorganic powder include powder of metal, metal oxide, metal carbonate, metal sulfate, metal nitride, metal carbide, and metal sulfide. The non-magnetic powder can be used alone or in combination of two or more kinds thereof. The non-magnetic powder can be purchased as a commercially available product or can be manufactured by a well-known method.

Specifically, titanium oxide such as titanium dioxide, cerium oxide, tin oxide, tungsten oxide, ZnO, $ZrO_2$, $SiO_2$, $Cr_2O_3$, α-alumina having an a transformation rate of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide can be used alone or in combination of two or more kinds thereof α-iron oxide and titanium oxide are preferable.

The shape of the non-magnetic powder may be any of a needle shape, a sphere shape, a polyhedron shape, and a plate shape. A crystallite size of the non-magnetic powder is preferably 4 nm to 500 nm and more preferably 40 nm to 100 nm. It is preferable that the crystallite size is 4 nm to 500 nm, because suitable surface roughness is obtained without any difficulties regarding dispersion. An average particle diameter of these non-magnetic powders is preferably 5 nm to 500 nm, and the same effect can also be exhibited by combining non-magnetic powders having different average particle diameters, if necessary, or widening the particle size distribution even with a single non-magnetic powder. The average particle diameter of the non-magnetic powder is particularly preferably 10 nm to 200 nm. It is preferable that the average particle diameter of the non-magnetic powder is 5 nm to 500 nm, because dispersion is performed in an excellent manner and suitable surface roughness is obtained.

A content (filling percentage) of the non-magnetic powder in the non-magnetic layer is preferably 50% to 90% by mass and more preferably 60% to 90% by mass.

The "binding agent" and the "additive" of the non-magnetic layer are the same as the "binding agent" and the "additive" described in the section of the "magnetic layer" and the preferable aspects are also the same as the preferable aspects thereof.

A thickness of the non-magnetic layer is preferably 0.05 μm to 3.0 μm, more preferably 0.05 μm to 2.0 μm, and even more preferably 0.05 μm to 1.5 μm.

Back Coating Layer

A back coating layer is a layer contributing to running stability. The back coating layer is preferably a layer including non-magnetic powder as a filler, and a binding agent which is a film forming component, and may further include additives, according to the purpose.

The back coating layer can be provided on a surface of the non-magnetic support on a side opposite to the magnetic layer side.

The "non-magnetic powder" of the back coating layer is the same as the "non-magnetic powder" described in the section of the "non-magnetic layer" and the preferable aspect is also the same as the preferable aspect thereof. In addition, the "binding agent" and the "additive" of the back coating layer are the same as the "binding agent" and the "additive" described in the section of the "magnetic layer" and the preferable aspects are also the same as the preferable aspects thereof.

A thickness of the back coating layer is preferably equal to or smaller than 0.9 μm and more preferably 0.1 μm to 0.7 μm.

Manufacturing Method of Magnetic Recording Medium

A manufacturing method of the magnetic recording medium of this disclosure is not particularly limited, and a well-known manufacturing method can be used.

As the manufacturing method of the magnetic recording medium, a manufacturing method including a step of preparing a magnetic layer forming composition (step (A)), a step of applying the magnetic layer forming composition onto a non-magnetic support to form a magnetic layer forming composition layer (step (B)), a step of performing alignment in magnetic field of the formed magnetic layer forming composition layer (step (c)), and a step of drying the magnetic layer forming composition layer subjected to the alignment in magnetic field to form a magnetic layer (step (D)) is used, for example.

The manufacturing method of the magnetic recording medium can further include a step of performing a calender process of the non-magnetic support including the magnetic layer, and a step of forming any layer such as a non-magnetic layer and a back coating layer.

Each step may be divided into two or more stages.

Step (A)

The manufacturing method of the magnetic recording medium preferably includes the step of preparing a magnetic layer forming composition (step (A)).

The step (A) includes adding and dispersing ferromagnetic powder, a binding agent, and if necessary, additives in a solvent.

All of the raw materials such as the ferromagnetic powder, the binding agent, the non-magnetic powder, and additives of this disclosure may be added in any stage of the step (A).

The raw materials may be added at the same time or may be added in two or more parts. For example, after adding the binding agent in a dispersion step, the binding agent can be further added for viscosity adjustment after the dispersion.

In the dispersion of the raw materials of the magnetic layer forming composition, a well-known dispersion apparatus such as a batch type vertical sand mill or a transverse beads mill can be used, for example. As the dispersion beads, glass beads, zirconia beads, titania beads, and steel beads can be used, for example. A particle diameter (bead diameter) and a filling percentage of the dispersion beads can be optimized and used.

In addition, the dispersion of the raw materials of the magnetic layer forming composition can also be performed by using a well-known ultrasonic device, for example.

Further, at least some raw materials of the magnetic layer forming composition can also be kneaded by using an open kneader, for example, before the dispersion.

Regarding the raw materials of the magnetic layer forming composition, solutions for the raw materials may be respectively prepared and mixed with each other. For example, a magnetic liquid including ferromagnetic powder and an abrasive solution including the abrasive can be respectively prepared, and mixed with each other for dispersion.

Magnetic Layer Forming Composition

The "ferromagnetic powder", the "binding agent", and the "additives" for preparing the magnetic layer forming composition are the same as the "ferromagnetic powder", the "binding agent", and the "additives" described in the section of the "magnetic layer" and the preferable aspects are also the same as the preferable aspects thereof.

A content of the ferromagnetic powder in the magnetic layer forming composition is preferably 5% to 50% by mass and more preferably 10% to 30% by mass, with respect to a total mass of the magnetic layer forming composition.

A content of the binding agent in the magnetic layer forming composition is preferably 1 part by mass to 30 parts by mass and more preferably 2 parts by mass to 20 parts by mass with respect to 100 parts by mass of the ferromagnetic powder.

Solvent

The solvent is a medium for dispersing the ferromagnetic powder, the binding agent, and if necessary, the additives.

One solvent may be used or a mixed solvent of two or more solvents may be used. As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N, N-dimethylformamide, hexane, and the like can be used, for example. Preferable examples of the organic solvent include methyl ethyl ketone, cyclohexanone, and a mixed solvent including these at any ratio.

In order to improve dispersibility, a solvent having strong polarity to some extent is preferable, and it is preferable that a content of a solvent having dielectric constant equal to or greater than 15 is equal to or greater than 50% by mass with respect to a total content of the solvent. In addition, a dissolution parameter is preferably 8 to 11.

Curing Agent

The magnetic layer forming composition can include a curing agent.

In a case where the magnetic layer forming composition includes a curing agent, a crosslinked structure is formed in the binding agent included in the magnetic layer, in a case of forming the magnetic layer, thereby further improving film hardness of the magnetic layer to be formed.

As the curing agent, an isocyanate-based compound is preferable. Examples of the isocyanate-based compound include isocyanate-based compounds such as tolylene diisocyanate, 4,4'-diphenylmethane diisocyanate, hexamethylene diisocyanate, xylylene diisocyanate, naphthyl ene-1,5-diisocyanate, o-toluidine diisocyanate, isophorone diisocyanate, and triphenylmethane triisocyanate. A product of these isocyanate-based compounds and polyalcohol, and di- or higher valent functional polyisocyanate generated due to condensation of the isocyanate-based compound can be used.

As the curing agent, a commercially available product can be suitably used. Examples of the product name of a commercially available isocyanate-based compound include CORONATE L, CORONATE HL, CORONATE 2030, CORONATE 2031, MILLIONATE MR, and MILLIONATE MTL manufactured by Nippon Polyurethane Industry Co., Ltd., TAKENATE D-102, TAKENATE D-110N, TAKENATE D-200, and TAKENATE D-202 manufactured by Takeda Pharmaceutical Company Limited, DESMODUR L, DESMODUR IL, DESMODUR N, and DESMODUR HL manufactured by Sumitomo Bayer Co., Ltd.

In a case where the magnetic layer forming composition includes the curing agent, the curing agent may be used alone or in combination of two or more kinds thereof.

In a case where the magnetic layer forming composition includes the curing agent, a content of the curing agent may be, for example, 0.1 parts by mass to 10 parts by mass with respect to 100.0 parts by mass of the ferromagnetic powder, and can be preferably 1 part by mass to 10 parts by mass, from a viewpoint of improving hardness of the magnetic layer.

If necessary, the curing agent can be included in a forming composition for another layer, in order to improve film hardness of the other layer, in a case of forming the other layer.

Step (B)

The manufacturing method of the magnetic recording medium of this disclosure preferably includes a step of applying the magnetic layer forming composition onto the non-magnetic support to form a magnetic layer forming composition layer (step (B)), after the composition preparation step.

The step (B) can be performed, for example, by applying the amount of magnetic layer forming composition onto the running non-magnetic support so as to obtain a predetermined film thickness. The preferable film thickness of the magnetic layer is as described in the section of the "magnetic layer".

As a coating method of applying the magnetic layer forming composition onto a surface of the support, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, spin coating can be used. Regarding the coating method, "Latest coating technologies" published by Sogo Gijutsu Center (31 May 1983) can be referred to, for example.

Step (C)

The manufacturing method of the magnetic recording medium of this disclosure preferably includes a step of performing alignment in magnetic field of the formed magnetic layer forming composition layer (step (C)), after the composition layer formation step.

In a case where the support has a film shape such as a magnetic tape, alignment in magnetic field of the formed magnetic layer forming composition layer can be performed with respect to the ferromagnetic powder included in the magnetic layer forming composition by using cobalt magnets or solenoid. In a case where the support is a support for a hard disk, isotropic orientation is sufficiently obtained without performing an alignment process without using an alignment device. A well-known random alignment device is preferably used by obliquely alternately disposing cobalt magnets or applying an alternating magnetic field by solenoid. In addition, isotropic magnetic properties can also be applied in a circumferential direction by performing homeotropic alignment by using a well-known method such as a method using a polar opposing magnet. Particularly, in a case of performing high-density recording, homeotropic alignment is preferable. In addition, circumferential alignment can also be performed by using a spin coating.

The alignment in magnetic field is preferably performed before drying the formed magnetic layer forming composition layer.

The alignment in magnetic field can be performed by a homeotropic alignment process of applying a magnetic field having magnetic field strength of 0.1 T to 1.0 T in a vertical direction to the surface of the formed magnetic layer forming composition layer.

Step (D)

The manufacturing method of the magnetic recording medium of this disclosure preferably includes a step of drying the magnetic layer forming composition layer subjected to the alignment in magnetic field to form a magnetic layer (step (D)), after the step (C) of performing the alignment in magnetic field.

In the drying of the magnetic layer forming composition layer, it is possible to control the drying of the magnetic layer forming composition layer by controlling a temperature of dry air, an air flow, or an application speed. For example, the application speed is preferably 20 m/min to 1,000 m/min and a temperature of the dry air is preferably equal to or higher than 60° C. In addition, preliminary drying of the composition can be suitably performed before applying a magnetic field.

Calender Process Step

In the manufacturing method of the magnetic recording medium of this disclosure, after the magnetic layer is formed on the support through the step (A), the step (B), the step (C), and the step (D), a step of performing a calender process with respect to the non-magnetic support including the magnetic layer is preferably performed.

The non-magnetic support including the magnetic layer is temporarily wound with a winding roll, unwound from the winding roll, and supplied for the calender process. By performing the calender process, surface smoothness is improved, and a filling percentage of the ferromagnetic powder in the magnetic layer is improved due to disappearance of holes generated due to removal of the solvent at the time of drying. Accordingly, it is possible to obtain a magnetic recording medium having higher electromagnetic conversion characteristics. The calender process is preferably performed while changing calender process conditions according to smoothness of the surface of the magnetic layer.

In the calender process, a super calender roll or the like can be used, for example.

As a calender roll, a heat resistant plastic roll such as epoxy, polyimide, polyamide, or polyamideimide can be used. In addition, the process can also be performed by a metal roll.

As the calender process conditions, a temperature of the calender roll can be, for example, 60° C. to 120° C. and can be preferably set as 80° C. to 100° C., and pressure can be, for example, 100 kg/cm to 500 kg/cm (98 kN/m to 490 kN/m) and can be preferably set as 200 kg/cm to 450 kg/cm (196 kN/m to 441 kN/m).

Step of Forming any Layer Such as Non-Magnetic Layer and Back Coating Layer

The manufacturing method of the magnetic recording medium of this disclosure can include a step of forming any layer such as the non-magnetic layer and the back coating layer.

The non-magnetic layer and the back coating layer can be formed by performing the same steps as the step (B), the step (C), and the step (D) for forming the magnetic layer, after preparing the composition for forming each layer.

As described in the sections of the "non-magnetic layer" and the "back coating layer", the non-magnetic layer can be provided between the support and the magnetic layer, and the back coating layer can be provided on a surface of the support on a side opposite to the side provided with the magnetic layer.

A forming composition of the non-magnetic layer and a forming composition of the back coating layer can be prepared with components and the contents described in the sections of the "non-magnetic layer" and the "back coating layer".

EXAMPLES

Hereinafter, the magnetic powder, the manufacturing method thereof, and the magnetic recording medium of this disclosure will be described more specifically with reference to examples, but this disclosure is not limited to the following specific examples, and various modifications can be performed as long as those are not departed from the gist of the invention.

"%" and "parts" in the examples are based on mass, unless otherwise noted.

Example 1

Manufacturing of Specific Metal Powder 4.0 g of ammonia aqueous solution having a concentration of 25% by mass was added to a mixture obtained by dissolving 8.3 g of iron (III) nitrate nonahydrate, 1.3 g of gallium (III) nitrate octahydrate, 190 mg of cobalt (II) nitrate hexahydrate, and 150 mg of titanium (IV) sulfate in 90 g of pure water, while stirring by using a magnetic stirrer, in an atmosphere under the conditions of 25° C., and this solution was stirred for 2 hours under the condition of a temperature of 25° C. 900 g of pure water was added to the stirred solution and heated to 70° C., 17 mL of tetraethoxysilane (TEOS) was added dropwise, and stirred for 24 hours while maintaining the temperature of 70° C. The obtained reaction solution is left overnight in a drying machine at 80° C., the precipitated solid was washed with pure water and dried again, thereby obtaining a precursor of the specific metal powder.

A furnace is filled with the obtained precursor of the specific metal powder and the precursor was subjected to heat treatment at 1,060° C. in the atmosphere for 4 hours. The heat-treated precursor of the specific metal powder was put into a sodium hydroxide (NaOH) aqueous solution having a concentration of 4 mol/L and stirred at a liquid temperature of 70° C. for 24 hours, to remove silicon oxide from the heat-treated precursor of the specific metal powder.

Then, the precursor of the specific metal powder, from which the silicon oxide was removed, is collected by performing centrifugal separation and washed with pure water, thereby obtaining iron oxide magnetic nano-particles having a single phase of an $\varepsilon$-Fe$_2$O$_3$ phase (specific metal powder).

The composition of the obtained specific metal powder was confirmed by high-frequency inductively coupled plasma emission spectral analysis (ICP-OES), and the composition was $\varepsilon$-Ga$_{0.24}$Co$_{0.05}$Ti$_{0.05}$Fe$_{1.66}$O$_3$. In addition, by confirming a peak of an X-ray diffraction (XRD) pattern of the powder, it was confirmed that the magnetic powder is magnetic powder having a $\varepsilon$-Fe$_2$O$_3$ single phase not including at least one iron oxide-based compound selected from $\alpha$-Fe$_2$O$_3$ and $\gamma$-Fe$_2$O$_3$.

An average particle diameter calculated by a method which will be described later was 16.7 nm and a particle shape was a sphere shape.

As an ICP-OES measurement device, ICPS-8100 manufactured by Shimadzu Corporation was used.

The measurement was performed by the following method.

A vessel (beaker) containing 12 mg of the sample powder and 10 mL of hydrochloric acid having a concentration of 4 mol/L was held on a hot plate at a set temperature of 80° C. for 3 hours, and a solution was obtained.

30 mL of pure water was added to the obtained solution, and the solution was filtered by using a membrane filter having a hole diameter of 0.1 μm.

The obtained filtrate was analyzed by the ICP-OES measurement device, and a content of each metal atom was obtained.

As the powder X-ray diffraction (XRD) device, X'Pert Pro manufactured by PANalytical was used, and the measurement was performed under the following measurement conditions.

X-ray source: Cu K$\alpha$ ray (wavelength of 1.54 Å (0.154 nm)), (output: 40 mA, 45 kV)

Scanned range: 20°<2θ<70°

Scan interval: 0.05°

Scan speed: 0.75°/min

Formation of Surface Treatment Layer 10 g of pure water and 90 g of ethanol were added to 1 g of the specific metal powder for dispersion. Then, pH of the dispersion liquid was adjusted to 3.5 by using hydrochloric acid.

After that, the dispersion liquid was held at 30° C., 10 mg of Octadecyltrimethoxysilane which is a silane coupling agent was added thereto and stirred for 30 minutes, and powder aggregated by a centrifugal separation process was washed with pure water and ethanol, thereby obtaining magnetic powder of Example 1 which includes $\varepsilon$-Fe$_2$O$_3$ and in which a surface treatment layer including a silane compound is formed on at least a part of the surface of the specific metal powder.

Calculation of Average Particle Diameter of Metal Powder and Magnetic Powder

The powder such as the specific metal powder was imaged at a magnification ratio of 80,000 by using a transmission electron microscope (TEM: manufactured by Hitachi, Ltd., transmission electron microscope H-9000) the image was printed on photographic printing paper so that the total magnification becomes 500,000, and an image of the particles configuring the powder was obtained.

A primary particle was selected from the obtained image of the particles, an outline of the particle was traced with a digitizer, and a size of the particle (primary particle) was measured. Here, the primary particle is an independent particle which is not aggregated. The particle size was measured by tracing an outline of each particle with a digitizer and calculating a diameter (equivalent circle area diameter) of a circle having the same area as the traced region. The measurement was performed by using image analysis software KS-400 manufactured by Carl Zeiss, as image analysis software.

The above measurement was performed regarding randomly extracted 500 particles.

An arithmetical mean of the 500 particle sizes obtained as described above was set as an average particle size of the powder. As described above, the average particle diameter was 16.7 nm.

Confirmation of Silane Compound in Surface Treatment Layer and C/Fe Content Ratio The surface treatment layer in the metal powder such as the specific metal powder was confirmed by using X-ray photoelectron spectroscopic analysis (XPS).

A monochromatic Al-K$\alpha$ ray was used as an excitation X-ray source, by using an X-ray photoelectron spectroscopic analysis device (AXIS-ULTRA: product name) manufactured by Shimadzu Corporation. The presence of Si on the surface of the metal powder was confirmed with the obtained spectra.

In addition, the C/Fe ratio (atom number ratio) was calculated from a peak area derived from C included in the silane compound and a peak area derived from Fe in the metal powder.

Examples 2 to 11

Magnetic powder was manufactured in the same manner as in Example 1, except that the kind and the amount of the silane compound used for the surface treatment in the manufacturing of the magnetic powder of Example 1, were changed to those shown in Table 1.

Manufacturing of Magnetic Recording Medium

List of Magnetic Liquid $\varepsilon$-Fe$_2$O$_3$ powder (magnetic powder described above): 100.0 parts Oleic acid: 2.0 parts
A vinyl chloride copolymer: (manufactured by Zeon Corporation, MR-104): (amount shown in Table 1)
$SO_3Na$ group-containing polyurethane resin: (amount shown in Table 1)
(Weight-average molecular weight: 70,000, $SO_3Na$ group amount: 0.07 meq/g)
An amine-based polymer: (amount shown in Table 1)
(DISPERBYK-102 manufactured by BYK Additives & Instruments)
Methyl ethyl ketone (solvent): 150.0 parts
Cyclohexanone: 150.0 parts
List of Abrasive Solution
α-alumina: 6.0 parts
(BET specific surface area of 19 m2/g, Mohs hardness of 9)
$SO_3Na$ group-containing polyurethane resin: 0.6 parts
(Weight-average molecular weight: 70,000, $SO_3Na$ group: 0.1 meq/g)
2,3-dihydroxynaphthalene: 0.6 parts
Cyclohexanone: 23.0 parts
List of Non-Magnetic Filler Solution
Colloidal silica: 2.0 parts
(Average particle size of 120 nm)
Methyl ethyl ketone: 8.0 parts
List of Lubricant and Curing Agent Solution
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Nippon Polyurethane Industry Co., Ltd.): 3.0 parts 1. Preparation of Magnetic Layer Forming Composition The magnetic layer forming composition was prepared by the following method.

Various components shown in the list of the magnetic liquid were dispersed with a batch type vertical sand mill by using zirconia beads having a bead diameter of 0.5 mmϕ (first dispersion beads, density of 6.0 g/cm$^3$) for 24 hours (first step). Then, filtering was performed by using a filter having an average hole diameter of 0.5 μm and a dispersion liquid A was prepared. The amount of zirconia beads which was 10 times of that of magnetic powder including ε-$Fe_2O_3$ based on mass was used.

After that, the obtained dispersion liquid A was dispersed with a batch type vertical sand mill by using diamond beads having a bead diameter of 500 nmϕ (second dispersion beads, density of 3.5 g/cm$^3$) for 1 hour, and a dispersion liquid (dispersion liquid B), from which the diamond beads were separated by using a centrifugal separator, was prepared and was set as magnetic liquid.

In regards to the abrasive solution, various components shown in the list of the abrasive solution were mixed with each other, zirconia beads having a bead diameter of 0.3 mmϕ was added thereto, the mixture was put into a transverse beads mill disperser, a value of bead volume/(volume of abrasive solution+bead volume) was adjusted to be 80%, a beads mill dispersion process was performed for 120 minutes, the processed liquid was extracted, and an ultrasonic dispersion filtering process was performed by using a flow type ultrasonic dispersion filtering device. By doing so, an abrasive solution was prepared.

The prepared magnetic liquid, the abrasive solution, the non-magnetic filler solution, and the lubricant and curing agent solution were introduced into a dissolver stirrer, stirred at a circumferential speed of 10 m/sec for 30 minutes, subjected to a process of 3 passes with a flow type ultrasonic disperser at a flow rate of 7.5 kg/min, and filtered with a filter having a hole diameter of 1 μm, thereby preparing a magnetic layer forming composition.

List of Non-Magnetic Layer Forming Composition
Non-magnetic inorganic powder α-iron oxide: 100.0 parts
(Average particle size: 10 nm, BET specific surface area: 75 m$^2$/g)
Carbon black: 25.0 parts
(Average particle size: 20 nm)
$SO_3Na$ group-containing polyurethane resin: 18.0 parts
(Weight-average molecular weight: 70,000, $SO_3Na$ group amount: 0.2 meq/g)
Stearic acid: 1.0 part
Cyclohexanone: 300.0 parts
Methyl ethyl ketone: 300.0 parts 2. Preparation of Non-Magnetic Layer Forming Composition Each component shown in the list of the non-magnetic layer forming composition was dispersed with a batch type vertical sand mill by using zirconia beads having a bead diameter of 0.1 mmϕ for 24 hours, and filtered by using a filter having an average hole diameter of 0.5 μm, thereby preparing a magnetic layer forming composition.

List of Back Coating Layer Forming Composition
Non-magnetic inorganic powder α-iron oxide: 80.0 parts
(Average particle size: 0.15 μm, BET specific surface area: 52 m$^2$/g)
Carbon black: 20.0 parts
(Average particle size: 20 nm)
A vinyl chloride copolymer: 13.0 parts
A sulfonic acid salt group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts 3. Preparation of Back Coating Layer Forming Composition Among the components shown in the list of the back coating layer forming composition, the components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill disperser and zirconia beads having a bead diameter of 1 mmϕ, by setting a bead filling percentage as 80 volume %, a circumferential speed of rotor distal end as 10 m/sec, and a retention time for 1 pass as 2 minutes.

After that, the remaining components were added and stirred with a dissolver, the dispersion liquid was filtered with a filter having an average hole diameter of 1 μm, and a back coating layer forming composition was prepared.

4. Manufacturing of Magnetic Tape

The non-magnetic layer forming composition prepared as described above was applied onto a surface of a support made of polyethylene naphthalate having a thickness of 5.0 μm (non-magnetic support) with the amount so that a thickness after drying becomes 100 nm, and dried, thereby forming a non-magnetic layer.

The magnetic layer forming composition prepared as described above was applied onto a surface of the formed non-magnetic layer with the amount so that a thickness after drying becomes 70 nm, and accordingly, a coating layer was formed.

A homeotropic alignment process of applying a magnetic field having a magnetic field strength of 0.15 T in a vertical direction with respect to a surface of the coating layer of the magnetic layer forming composition, while the formed coating layer of the magnetic layer forming composition is wet (not dried).

Then, the coating layer of the magnetic layer forming composition subjected to the homeotropic alignment process was dried and a magnetic layer was formed.

The back coating layer forming composition prepared as described above was applied to the surface of the non-magnetic support opposite to the surface, where the non-magnetic layer and the magnetic layer were formed, so that a thickness after the drying becomes 0.4 μm and was dried.

A calender process (surface smoothing treatment) was performed with respect to a tape formed with the magnetic layer, the non-magnetic layer, and the back coating layer by a pair of calender rolls configured of only a metal roll, at a speed of 100 m/min, linear pressure of 300 kg/cm (294 kN/m), and a surface temperature of a calender roll of 100° C., and then, the heat treatment was performed in the environment of the atmosphere temperature of 70° C. for 36 hours.

After the heat treatment, slitting was performed to have a width of ½ inches (0.0127 meters), and a magnetic tape as a magnetic recording medium was obtained.

Evaluation of Magnetic Recording Medium

Regarding the magnetic tape as the obtained magnetic recording medium, the following evaluations were performed and the results were shown in Table 1.

1. Signal-Noise Ratio: Evaluation of SNR

Electromagnetic conversion characteristics of each magnetic tape of the examples and the comparative examples were measured by the following method using a reel tester having a width of ½ inches (0.0127 meters) fixed to a head.

A head/tape relative speed was 6 m/s. In the recording, a metal-in-gap (MIG) head (gap length of 0.15 μm, track width of 1.0 μm) was used, and a recording current was set as an optimal recording current of each magnetic tape.

As a reproducing head, a giant-magnetoresistive (GMR) head having an element thickness of 15 nm, a shield interval of 0.1 μm, and a lead width of 0.5 μm was used.

The recording of a signal was performed at a linear recording density of 270 KFCI, and a reproduction signal was measured with a spectrum analyzer manufactured by Shibasoku Co., Ltd.

A ratio of an output value (S) of a carrier signal and integral noise (N) over whole spectral range was set as an SNR. For the SNR measurement, a part of a signal which is sufficiently stabilized after running of each magnetic tape was used.

2. Evaluation of Magnetic Properties (Alignment σr)

The magnetic properties of the obtained medium were measured by using an oscillation sample type magnetic-flux meter (manufactured by Tamakawa Co., Ltd.), at a maximum applying magnetic field of 4.5 kOe, a temperature of 296 K, and a magnetic field sweeping speed of 250 e/s.

σr is a value of magnetization at an applying magnetic field of 0 T. The unit was set as emu/cm2 of the magnetization amount per unit area of the magnetic tape.

Comparative Example 1 and Comparative Example 2

In the preparation of the magnetic layer forming composition of Example 1, the magnetic layer forming composition was prepared by using the metal powder not subjected to the surface treated with a silane coupling agent as the specific metal powder, and setting the content of the binding agent as the amount shown in Table 1. A magnetic tape was manufactured in the same manner as in Example 1, except that the obtained comparative magnetic layer forming composition was used, and the evaluations were performed in the same manner as in Example 1.

The results were shown in Table 1.

Comparative Example 3

A magnetic tape was manufactured in the same manner as in Example 8, except that the amount of the silane coupling agent used in the surface treatment of the specific metal powder in the preparation of the magnetic layer forming composition of Example 8 was changed as shown in Table 1 and the stirring time was changed to 15 minutes, and the evaluations were performed in the same manner as in Example 1.

The results were shown in Table 1.

Comparative Example 4

A magnetic tape was manufactured in the same manner as in Example 8, except that the amount of the silane coupling agent used in the surface treatment of the specific metal powder in the preparation of the magnetic layer forming composition of Example 8 was changed as shown in Table 1 and the stirring time was changed to 60 minutes, and the evaluations were performed in the same manner as in Example 1.

The results were shown in Table 1.

Comparative Example 5

Polyvinylpyrrolidone (viscosity property value: K30, manufactured by Wako Pure Chemical Industries, Ltd.) was used instead of the silane coupling agent used in the surface treatment of the specific metal powder in the preparation of the magnetic powder of Example 1. 1 g of a polyvinylpyrrolidone solution having a concentration of 1% was added to a mixture obtained by adding 100 g of pure water to 1 g of the specific metal powder. Zr beads having a diameter of 100 μm were added to the obtained mixture, and shaken with a shaker at room temperature for 10 minutes. Powder after the process was collected by performing centrifugal separation, washed with pure water several times, dried, and collected. A magnetic tape was manufactured in the same manner as in Example 1, except that the obtained comparative magnetic powder was replaced with the magnetic powder obtained in Example 1, and the evaluations were performed in the same manner as in Example 1.

The results were shown in Table 1.

Comparative Example 6

A magnetic tape was manufactured in the same manner as in Comparative Example 5, except that polyvinyl alcohol (manufactured by Wako Pure Chemical Industries, Ltd., average degree of polymerization: 500, complete saponification type) was used instead of polyvinylpyrrolidone used in the surface treatment of the specific metal powder in the preparation of the magnetic powder of Comparative Example 5, and the evaluations were performed in the same manner as in Example 1.

Comparative Example 7

A magnetic tape was manufactured in the same manner as in Comparative Example 5, except that cetyltrimethylammonium bromide was used instead of polyvinylpyrrolidone used in the surface treatment of the specific metal powder in the preparation of the magnetic powder of Comparative Example 5, and the evaluations were performed in the same manner as in Example 1.

The results were shown in Table 1.

TABLE 1

| | Silane compound or comparative compound | | Surface treatment layer | Binding agent of magnetic layer | | | Performance evaluation | |
|---|---|---|---|---|---|---|---|---|
| | | | | Amount of vinyl chloride copolymer with respect to 100 parts of | Amount of $SO_3Na$ group-containing polyurethane resin with respect to 100 parts of | Amount of amine-based polymer with respect to 100 parts of | Alignment or after obtaining medium | SNR of medium (dB) |
| | Compound | Amount used (mg) | C/Fe ratio (%) | magnetic material (part) | magnetic material (part) | magnetic material (part) | (emu × $10E-4/cm^2$) | (compared to Comparative Example 1) |
| Example 1 | Octadecyltrimethoxysilane | 10 | 0.30 | 8.0 | 3.2 | 4.8 | 4.17 | +0.8 |
| Example 2 | Dodecyltriethoxysilane | 8 | 0.22 | 8.0 | 3.2 | 4.8 | 4.51 | +1.0 |
| Example 3 | Triethoxyoctylsilane | 6 | 0.18 | 8.0 | 3.2 | 4.8 | 4.40 | +0.9 |
| Example 4 | Hexyltrimethoxysilane | 5 | 0.12 | 8.0 | 3.2 | 4.8 | 3.82 | +0.6 |
| Example 5 | Trimethoxypropylsilane | 2 | 0.06 | 8.0 | 3.2 | 4.8 | 3.59 | +0.4 |
| Example 6 | Triethoxyphenylsilane | 6 | 0.11 | 8.0 | 3.2 | 4.8 | 3.86 | +0.6 |
| Example 7 | p-styryltrimethoxysilane | 8 | 0.15 | 8.0 | 3.2 | 4.8 | 4.29 | +0.8 |
| Example 8 | N-phenyl-3-aminopropyl-trimethoxysilane | 9 | 0.17 | 8.0 | 3.2 | 4.8 | 4.67 | +1.2 |
| Example 9 | N-phenyl-3-aminopropyl-trimethoxysilane | 9 | 0.17 | 9.0 | 3.6 | 5.4 | 4.12 | +0.8 |
| Example 10 | N-phenyl-3-aminopropyl-trimethoxysilane | 9 | 0.17 | 7.0 | 2.8 | 4.2 | 3.92 | +0.7 |
| Example 11 | N-phenyl-3-aminopropyl-trimethoxysilane | 9 | 0.17 | 10.0 | 4.0 | 6.0 | 3.65 | +0.4 |
| Comparative Example 1 | None | — | 0.00 | 10.0 | 4.0 | 6.0 | 2.60 | ±0 (reference) |
| Comparative Example 2 | None | — | 0.00 | 8.0 | 3.2 | 4.8 | 2.44 | −0.3 |
| Comparative Example 3 | N-phenyl-3-aminopropyl-trimethoxysilane | 5 | 0.04 | 8.0 | 3.2 | 4.8 | 2.55 | −0.1 |
| Comparative Example 4 | N-phenyl-3-aminopropyl-trimethoxysilane | 30 | 0.53 | 8.0 | 3.2 | 4.8 | 2.67 | ±0 |
| Comparative Example 5 | Polyvinylpyrrolidone | 1* | 0.26 | 8.0 | 3.2 | 4.8 | 2.58 | ±0 |
| Comparative Example 6 | Polyvinyl alcohol | 1* | 0.33 | 8.0 | 3.2 | 4.8 | 2.61 | ±0 |
| Comparative Example 7 | cetyltrimethylammonium bromide | 1* | 0.31 | 8.0 | 3.2 | 4.8 | 2.53 | −0.1 |

In Table 1, a symbol 1* is a symbol which does not indicate a content of a comparative surface treatment agent, but indicates that the magnetic powder shown in Comparative Example 5 to Comparative Example 7 including each surface treatment layer is obtained by the manufacturing method shown in each comparative example.

With the evaluation results shown in Table 1, it is found that, the magnetic powder of Example 1 to Example 11 has excellent dispersibility, and as a result, a filling percentage in a case where the magnetic layer of the magnetic tape was formed is improved, and all SNRs are better than that of Comparative Example 1 which is a reference, and a value of alignment after obtaining a medium is high.

On the other hand, it is found that, in a case of using the magnetic powder of the comparative examples not including the silane compound in the surface treatment layer, an excellent SNR caused by the improvement of the filling percentage of the magnetic particles is not achieved, although a general dispersing agent was used, and alignment in a case of obtaining a magnetic recording medium is deteriorated compared to those in the examples.

What is claimed is:

1. Magnetic powder comprising:
   at least one epsilon-phase iron oxide-based compound selected from the group consisting of $\varepsilon\text{-Fe}_2\text{O}_3$ and a compound represented by Formula (1); and
   a surface treatment layer including a silane compound on at least a part of a surface,
   wherein the magnetic powder has an average particle diameter of 8 nm to 20 nm, and
   a content ratio of carbon atoms of the silane compound included in the surface treatment layer to iron atoms of the at least one epsilon-phase iron oxide-based compound selected from the group consisting of $\varepsilon\text{-Fe}_2\text{O}_3$ and the compound represented by Formula (1) is 0.05% to 0.5% in terms of the number of atoms, $$\varepsilon\text{-A}_a\text{Fe}_{2-a}\text{O}_3 \quad (1)$$

wherein, in Formula (1), A represents at least one metal element other than Fe and a represents a number that satisfies a relationship of 0<a<2.

2. The magnetic powder according to claim 1, wherein the compound represented by Formula (1) is a compound represented by Formula (1-2), $$\varepsilon\text{-A}^1_x\text{A}^2_y\text{A}^3_z\text{Fe}_{(2-x-y-z)}\text{O}_3 \quad (1-2)$$

in Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn, x represents a number that satisfies a relationship of 0<x<1, y represents a number that satisfies a relationship of 0<y<1, z represents a number that satisfies a relationship of 0<z<1, and x+y+z<2.

3. The magnetic powder according to claim 1, wherein the silane compound is a silane compound having a partial structure represented by Formula (I),

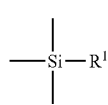

(I)

in Formula (I), $R^1$ represents a hydrocarbon group having 3 to 20 carbon atoms.

4. Magnetic powder comprising:
   at least one epsilon-phase iron oxide-based compound selected from the group consisting of $\varepsilon\text{-Fe}_2\text{O}_3$ and a compound represented by Formula (1); and
   a surface treatment layer including a silane compound having an aromatic ring in a molecule on at least a part of a surface,
   wherein the magnetic powder has an average particle diameter of 8 nm to 20 nm, and
   a content ratio of carbon atoms of the silane compound included in the surface treatment layer to iron atoms of the at least one epsilon-phase iron oxide-based compound selected from the group consisting of $\varepsilon\text{-Fe}_2\text{O}_3$ and the compound represented by Formula (1) is 0.05% to 0.5% in terms of the number of atoms, $$\varepsilon\text{-A}_a\text{Fe}_{2-a}\text{O}_3 \quad (1)$$

wherein, in Formula (1), A represents at least one metal element other than Fe and a represents a number that satisfies a relationship of 0<a<2.

5. The magnetic powder according to claim 1, wherein a total content of at least one iron oxide-based compound selected from $\alpha\text{-Fe}_2\text{O}_3$ and $\gamma\text{-Fe}_2\text{O}_3$ is equal to or smaller than 20 parts by mass with respect to 100 parts by mass of a total content of at least one epsilon-phase iron oxide-based compound selected from the group consisting of $\varepsilon\text{-Fe}_2\text{O}_3$ and the compound represented by Formula (1).

6. A manufacturing method of the magnetic powder according to claim 1, comprising:
   performing surface treatment with respect to a surface of particles of at least one epsilon-phase iron oxide-based compound selected from the group consisting of $\varepsilon\text{-Fe}_2\text{O}_3$ and the compound represented by Formula (1) with a silane compound including a hydrolyzable organic group in a molecule, to form a surface treatment layer including the silane compound on at least a part of a surface, $$\varepsilon\text{-A}_a\text{Fe}_{2-a}\text{O}_3 \quad (1)$$

wherein, in Formula (1), A represents at least one metal element other than Fe and a represents a number that satisfies a relationship of 0<a<2.

7. A magnetic recording medium comprising:
   a non-magnetic support; and
   a magnetic layer including the magnetic powder according to claim 1 and provided on the non-magnetic support.

8. The magnetic powder according to claim 4, wherein the compound represented by Formula (1) is a compound represented by Formula (1-2), $$\varepsilon\text{-A}^1_x\text{A}^2_y\text{A}^3_z\text{Fe}_{(2-x-y-z)}\text{O}_3 \quad (1-2)$$

in Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn, x represents a number that satisfies a relationship of 0<x<1, y represents a number that satisfies a relationship of 0<y<1, z represents a number that satisfies a relationship of 0<z<1, and x+y+z<2.

9. The magnetic powder according to claim 4,
wherein a total content of at least one iron oxide-based compound selected from $\alpha\text{-Fe}_2\text{O}_3$ and $\gamma\text{-Fe}_2\text{O}_3$ is equal to or smaller than 20 parts by mass with respect to 100 parts by mass of a total content of at least one epsilon-phase iron oxide-based compound selected from the group consisting of $\varepsilon\text{-Fe}_2\text{O}_3$ and the compound represented by Formula (1).

10. A manufacturing method of the magnetic powder according to claim 4, comprising:
performing surface treatment with respect to a surface of particles of at least one epsilon-phase iron oxide-based compound selected from the group consisting of $\varepsilon\text{-Fe}_2\text{O}_3$ and the compound represented by Formula (1) with a silane compound including a hydrolyzable organic group in a molecule, to form a surface treatment layer including the silane compound on at least a part of a surface, $$\varepsilon\text{-A}_a\text{Fe}_{2-a}\text{O}_3 \tag{1}$$

wherein, in Formula (1), A represents at least one metal element other than Fe and a represents a number that satisfies a relationship of $0<a<2$.

11. A magnetic recording medium comprising:
a non-magnetic support; and
a magnetic layer including the magnetic powder according to claim 4 and provided on the non-magnetic support.

12. Magnetic powder comprising:
at least one epsilon-phase iron oxide-based compound selected from the group consisting of $\varepsilon\text{-Fe}_2\text{O}_3$ and a compound represented by Formula (1); and
a surface treatment layer including a silane compound on at least a part of a surface, the silane compound including a hydrocarbon group having 3 to 20 carbon atoms directly bonded to a Si atom,
wherein the magnetic powder has an average particle diameter of 8 nm to 20 nm, and
a content ratio of carbon atoms of the silane compound included in the surface treatment layer to iron atoms of the at least one epsilon-phase iron oxide-based compound selected from the group consisting of $\varepsilon\text{-Fe}_2\text{O}_3$ and the compound represented by Formula (1) is 0.05% to 0.5% in terms of the number of atoms, $$\varepsilon\text{-A}_a\text{Fe}_{2-a}\text{O}_3 \tag{1}$$

wherein, in Formula (1), A represents at least one metal element other than Fe and a represents a number that satisfies a relationship of $0<a<2$.

13. The magnetic powder according to claim 12,
wherein the compound represented by Formula (1) is a compound represented by Formula (1-2), $$\varepsilon\text{-A}^1_x\text{A}^2_y\text{A}^3_z\text{Fe}_{(2-x-y-z)}\text{O}_3 \tag{1-2}$$

in Formula (1-2), $A^1$ represents at least one trivalent metal element selected from the group consisting of Ga, Al, In, and Rh, $A^2$ represents at least one divalent metal element selected from the group consisting of Mn, Co, Ni, and Zn, $A^3$ represents at least one tetravalent metal element selected from the group consisting of Ti and Sn, x represents a number that satisfies a relationship of $0<x<1$, y represents a number that satisfies a relationship of $0<y<1$, z represents a number that satisfies a relationship of $0<z<1$, and $x+y+z<2$.

14. The magnetic powder according to claim 12,
wherein a total content of at least one iron oxide-based compound selected from $\alpha\text{-Fe}_2\text{O}_3$ and $\gamma\text{-Fe}_2\text{O}_3$ is equal to or smaller than 20 parts by mass with respect to 100 parts by mass of a total content of at least one epsilon-phase iron oxide-based compound selected from the group consisting of $\varepsilon\text{-Fe}_2\text{O}_3$ and the compound represented by Formula (1).

15. A manufacturing method of the magnetic powder according to claim 12, comprising:
performing surface treatment with respect to a surface of particles of at least one epsilon-phase iron oxide-based compound selected from the group consisting of epsilon-phase iron oxide-based compound selected from the group consisting of $\varepsilon\text{-Fe}_3\text{O}_3$ and the compound represented by Formula (1) with a silane compound including a hydrolyzable organic group in a molecule, to form a surface treatment layer including the silane compound on at least a part of a surface, $$\varepsilon\text{-A}_a\text{Fe}_{2-a}\text{O}_3 \tag{1}$$

wherein, in Formula (1), A represents at least one metal element other than Fe and a represents a number that satisfies a relationship of $0<a<2$.

16. A magnetic recording medium comprising:
a non-magnetic support; and
a magnetic layer including the magnetic powder according to claim 12 and provided on the non-magnetic support.

* * * * *